United States Patent [19]

Iseki et al.

[11] Patent Number: 4,985,377

[45] Date of Patent: Jan. 15, 1991

[54] GLAZE RESISTOR

[75] Inventors: Takeshi Iseki, Osaka; Osamu Makino, Hirakata; Mitsuo Ioka, Moriguchi; Hirotoshi Watanabe, Osaka, all of Japan

[73] Assignee: Matsushita Electric Industrial Co., Ltd., Osaka, Japan

[21] Appl. No.: 281,025

[22] Filed: Dec. 7, 1988

[30] Foreign Application Priority Data

Dec. 14, 1987 [JP] Japan ............................... 62-315899

[51] Int. Cl.[5] ............................................ C03C 31/155

[52] U.S. Cl. ......................................... 501/51; 501/77; 501/78; 501/19; 252/520

[58] Field of Search ............... 252/518, 519, 520, 521; 501/51, 77, 78, 19, 96

[56] References Cited

U.S. PATENT DOCUMENTS

| | | | |
|---|---|---|---|
| 4,039,997 | 8/1977 | Huang | 338/308 |
| 4,119,573 | 10/1978 | Ishida | 252/519 |
| 4,323,484 | 4/1982 | Hattori | 252/521 |
| 4,513,062 | 4/1985 | Suzuki | 428/565 |
| 4,695,504 | 9/1987 | Watanabe | 428/209 |

*Primary Examiner*—William R. Dixon, Jr.
*Attorney, Agent, or Firm*—Stevens, Davis, Miller & Mosher

[57] ABSTRACT

The invention relates to glaze resistors which are used for electronic parts of hybrid integrated circuit devices, chip resistors, resistor network, etc. The glaze resistor comprises 4.0 to 70.0 wt % of a conductive component composed of a metal silicide and a metal boride and 30.0 to 96.0 wt % of glass in which a rate of said metal boride is 1.0 to 68.0 wt %. Thus, the glaze resistor can be formed by sintering in a non-oxidizing atmosphere and can provide a circuit, together with conductor pattern of base metals such as Cu.

9 Claims, 1 Drawing Sheet

GLAZE RESISTOR

BACKGROUND OF THE INVENTION

1. Field of Invention

The present invention relates to a glaze resistor which can be formed by sintering in a non-oxidizing atmosphere. According to this glaze resistor, base metals conductor pattern such as a Cu conductor pattern, etc. and thick film resistors can be formed on the same ceramic substrate.

2. Statement of the Prior Art

In the field of thick film hybrid integrated circuit (IC), novel metals such as Ag, AgPd, AgPt, etc. are used as conductor pattern and $RuO_2$ type is used as a resistor (e.g., "Thick Film IC Technology", edited by Japan Microelectronics Association, pages 26–34, published by Kogyo Chosakai).

Recently, demand for high density circuit and high speed digital circuit has been increasing in the field of thick film hybrid IC. However, in conventional Ag type conductor pattern, problems of migration and circuit impedance arise and, the demand cannot be sufficiently met. Thus thick film hybrid IC using a Cu conductor pattern is viewed to be promising. However, the Cu conductor pattern is oxidized by sintering in the air so that a resistor used for the Cu conductor pattern must be formed by sintering in a non-oxidizing atmosphere. Glaze resistors which meet the requirement and have practicable characteristics have not been developed yet.

SUMMARY OF THE INVENTION

Therefore, an object of the present invention is to provide a glaze resistor which can be formed by sintering not only in the air but also in a non-oxidizing atmosphere that can be coupled with a Cu conductor pattern.

Figure 1:
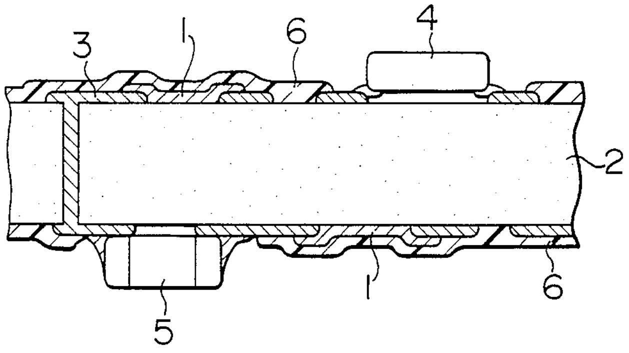
FIG. 1 is a cross-sectional view of an embodiment of a hybrid integrated circuit device constituted by the glaze resistor of the present invention.

| | |
|---|---|
| 1, 11, 21 | resistor |
| 2, 12, 22 | ceramic substrate |
| 3, 13, 23 | electrode |
| 4 | semiconductor element |
| 5 | chip part |
| 6, 16 | overcoat |
| 14 | Ni plated layer |
| 15 | Sn-Pb plated layer |
| 24 | lead terminal |
| 25 | coating material |

DETAILED DESCRIPTION OF PREFERRED EMBODIMENTS

For achieving the objects of the present invention described above, the glaze resistor of the present invention comprises 4.0 to 70.0 wt% of a conductive component composed of a metal silicide and a metal boride and 30.0 to 96.0 wt% of glass in which a rate of the metal boride is 1.0 to 68.0 wt%. When the conductive component composed of the metal silicide and the metal boride is greater than 70.0 wt%, sintering properties of the resistor is deteriorated; when the conductive component is less than 4.0 wt%, no conducting path is formed on the resistor and sufficient characteristics are not obtained. Further when the metal boride exceeds 68.0 wt%, sintering properties of the resistor is deteriorated; with less than 1.0 wt%, there is no effect that is to be exhibited by adding the metal boride and sufficient properties are not obtained.

Glass which is usable in the present invention is one comprising boric oxide as the main component and having a softening point of 600 to 700° C.

As the metal boride, mention may be made of tantalum boride, niobium boride, tungsten boride, molybdenum boride, chromium boride, titanium boride, zirconium boride, etc. The metal boride may also be used as admixture of two or more.

Titanium boride containing 90 wt% or more $TiB_2$ and zirconium boride containing 90 wt% or more $ZrB_2$ are preferred. It is more preferred to use a mixture of both.

As the metal silicide, mention may be made of tantalum silicide, tungsten silicide, molybdenum silicide, niobium silicide, titanium silicide, chromium silicide, zirconium silicide, vanadium silicide, etc.

As tantalum silicide, tungsten silicide, molybdenum silicide, niobium silicide, titanium silicide, chromium silicide, zirconium silicide and vanadium silicide, preferred are those containing 90 wt% or more $TaSi_2$, $WSi_2$, $MoSi_2$, $NbSi_2$, $TiSi_2$, $CrSi_2$, $ZrSi_2$ and $VSi_2$, respectively.

The glaze resistor in accordance with the present invention may be incorporated with at least one of $Ta_2O_5$, $Nb_2O_5$, $V_2O_5$, $MoO_3$, $WO_3$, $ZrO_2$,$TiO_2$ and $Cr_2O_3$ and low degree oxides thereof.

Further at least one of Si, $Si_3N_4$, SiC, AlN, BN, $SiO_2$, etc. may also be incorporated.

The glaze resistor in accordance with the present invention is applicable to a hybrid integrated circuit device.

A resistor paste is prepared from the inorganic powder having the composition described above and a vehicle obtained by dissolving a resin binder in a solvent. The resistor paste is printed onto a ceramic substrate, which is sintered at 850 to 950° C. in a non-oxidizing atmosphere. Thus, a resistor having practically usable properties can be obtained. Accordingly, a thick film resistor can be formed on a ceramic substrate for forming a conductor of base metal such as Cu, etc.

EXAMPLE 1

Next, the glaze resistor in accordance with the present invention is described below.

As glass, there was used one composed of 36.0 wt% of boric oxide ($B_2O_3$), 36.0 wt% of barium oxide (BaO), 9.0 wt% of silicon oxide ($SiO_2$), 5.0 wt% of aluminum oxide ($Al_2O_3$), 4.0 wt% of titanium oxide ($TiO_2$), 4.0 wt% of zirconium oxide ($ZrO_2$), 2.0 wt% of tantalum oxide ($Ta_2O_5$), 2.0 wt% of calcium oxide (CaO) and 2.0 wt% of magnesium oxide (MgO) and having a softening point of about 670° C.

The glass described above, $TaSi_2$ and $TiB_2$ were formulated in ratios shown in Table 1. The mixture was kneaded with a vehicle (solution of acryl resin in terpineol) to make a resistor paste. This resistor paste was printed onto 96% alumina substrate in which electrodes were Cu thick film conductors, through a screen of 250 mesh. After drying at a temperature of 120° C., the system was sintered by passing through a tunnel furnace purged with nitrogen gas and heated to the maximum temperature at 900° C. to form a resistor. A sheet resistance value of this resistor at 25° C. and a temperature coefficient of resistance measured between 25° C. and 125° C. are shown in Table 1. In loaded life span (evaluated by rate of change in resistance value after the operation of applying a loading power of 150 $mW/mm^2$ for 1.5 hours and removing for 0.5 hours was repeated at an ambient temperature of 70° C. for 1000 hours), moisture resistance property (evaluated by rate of change in resistance value after 1000 hours lapsed at an ambient temperature of 85° C. in relative humidity of 85%) and thermal shock property (evaluated by rate of change in resistance value after the operation of allowing to stand at an ambient temperature of −65° C. for 30 minutes and at an ambient temperature of 125° C. for 30 minutes was repeated for 1000 hours), rates of change in resistance values were all within ±1%.

TABLE 1

| Sample No. | Composition: $TaSi_2$ (wt %) | Composition: $TiB_2$ (wt %) | Composition: Glass (wt %) | Property: Resistance Value (ohm/□) | Property: Temperature Coefficient of Resistance (ppm/°C.) |
|---|---|---|---|---|---|
| 1 | 10.0 | 5.0 | 85.0 | 231050 | −420 |
| 2 | 13.0 | 5.0 | 82.0 | 51350 | −277 |
| 3 | 20.0 | 10.0 | 70.0 | 977.1 | −18 |
| 4 | 2.0 | 68.0 | 30.0 | 31.2 | 121 |
| 5 | 40.0 | 30.0 | 30.0 | 8.3 | 218 |

EXAMPLE 2

The same glass as shown in Example 1, $TaSi_2$ and boride A (a mixture of $TiB_2$ and $ZrB_2$ in equimolar amounts) were formulated in ratios shown in Table 2. The mixture was kneaded with a vehicle (solution of acryl resin in terpineol) to make a resistor paste. This resistor paste was treated in a manner similar to Example 1 to form a resistor onto 96% alumina substrate. A sheet resistance value of this resistor at 25° C. and a temperature coefficient of resistance measured between 25° C. and 125° C. are shown in Table 2. The loaded life span, moisture resistance property and thermal shock property were determined as in Example 1 and rates of change in resistance values were all within ±1%.

TABLE 2

| Sample No. | Composition: $TaSi_2$ (wt %) | Composition: Boride A (wt %) | Composition: Glass (wt %) | Property: Resistance Value (ohm/□) | Property: Temperature Coefficient of Resistance (ppm/°C.) |
|---|---|---|---|---|---|
| 6 | 10.0 | 8.0 | 82.0 | 168300 | −401 |
| 7 | 15.0 | 5.0 | 80.0 | 36210 | −202 |
| 8 | 18.0 | 12.0 | 70.0 | 1013.1 | 12 |
| 9 | 20.0 | 30.0 | 50.0 | 150.2 | 88 |
| 10 | 40.0 | 30.0 | 30.0 | 7.6 | 223 |

EXAMPLE 3

The same glass as shown in Example 1, silicide A (a mixture of $TaSi_2$, $WSi_2$, $MoSi_2$, $NbSi_2$, $TiSi_2$, $CrSi_2$, $ZrSi_2$ and $VSi_2$ in equimolar amounts) and $TaB_2$ were formulated in ratios shown in Table 3. The mixture was kneaded with a vehicle (solution of acryl resin in terpineol) to make a resistor paste. This resistor paste was treated in a manner similar to Example 1 to form a resistor onto 96% alumina substrate. A sheet resistance value of this resistor at 25° C. and a temperature coefficient of resistance measured between 25° C. and 125° C. are shown in Table 3. The loaded life span, moisture resistance property and thermal shock property were determined as in Example 1 and rates of change in resistance values were all within ±1%.

TABLE 3

| Sample No. | Composition: Silicide A (wt %) | Composition: $TaB_2$ (wt %) | Composition: Glass (wt %) | Property: Resistance Value (ohm/□) | Property: Temperature Coefficient of Resistance (ppm/°C.) |
|---|---|---|---|---|---|
| 11 | 3.0 | 1.0 | 96.0 | 913200 | −633 |
| 12 | 10.0 | 5.0 | 85.0 | 100210 | −316 |
| 13 | 15.0 | 15.0 | 70.0 | 1056.1 | 12 |
| 14 | 30.0 | 10.0 | 60.0 | 100.5 | 101 |
| 15 | 40.0 | 20.0 | 40.0 | 8.2 | 215 |

EXAMPLE 4

The same glass as shown in Example 1, silicide A (a mixture of $TaSi_2$, $WSi_2$, $MoSi_2$, $NbSi_2$, $TiSi_2$, $CrSi_2$, $ZrSi_2$ and $VSi_2$ in equimolar amounts) and boride A (a mixture of $TiB_2$ and $ZrB_2$ in equimolar amounts) were formulated in ratios shown in Table 4. The mixture was kneaded with a vehicle (solution of acryl resin in terpineol) to make a resistor paste. This resistor paste was treated in a manner similar to Example 1 to form a resistor onto 96% alumina substrate. A sheet resistance value of this resistor at 25° C. and a temperature coefficient of resistance measured between 25° C. and 125° C. are shown in Table 4. The loaded life span, moisture resistance property and thermal shock property were determined as in Example 1 and rates of change in resistance values were all within ±1%.

TABLE 4

| Sample No. | Composition: Silicide A(wt %) | Composition: Boride A(wt %) | Composition: Glass (wt %) | Property: Resistance Value (ohm/□) | Property: Temperature Coefficient of Resistance (ppm/°C.) |
|---|---|---|---|---|---|
| 16 | 5.0 | 5.0 | 90.0 | 457700 | −512 |
| 17 | 10.0 | 5.0 | 85.0 | 90380 | −308 |
| 18 | 20.0 | 8.0 | 72.0 | 923.6 | 32 |
| 19 | 20.0 | 40.0 | 40.0 | 44.6 | 121 |
| 20 | 30.0 | 35.0 | 35.0 | 9.2 | 202 |

EXAMPLE 5

As glass, there was used one composed of 36.0 wt% of boric oxide ($B_2O_3$), 36.0 wt% of barium oxide (BaO), 9.0 wt% of silicon oxide ($SiO_2$), 5.0 wt% of aluminum oxide ($Al_2O_3$), 3.0 wt% of tantalum oxide ($Ta_2O_5$), 3.0 wt% of niobium oxide ($Nb_2O_5$), 3.0 wt% of vanadium oxide ($V_2O_5$), 3.0 wt% of calcium oxide (CaO) and 2.0 wt% of magnesium oxide (MgO) and having a softening point of about 640° C.

The glass described above, $TiSi_2$ and $TaB_2$ were formulated in ratios shown in Table 5. The mixture was kneaded with a vehicle (solution of acryl resin in terpineol) to make a resistor paste. This resistor paste was treated in a manner similar to Example 1 to form a resistor onto 96% alumina substrate. A sheet resistance value of this resistor at 25° C. and a temperature coefficient of resistance measured between 25° C. and 125° C. are shown in Table 5. The loaded life span, moisture resistance property and thermal shock property were determined as in Example 1 and rates of change in resistance values were all within ±1%.

TABLE 5

| Sample No. | Composition TiSi$_2$ (wt %) | TaB$_2$ (wt %) | Glass (wt %) | Property Resistance Value (ohm/□) | Temperature Coefficient of Resistance (ppm/°C.) |
|---|---|---|---|---|---|
| 21 | 2.0 | 2.0 | 96.0 | 102100 | −402 |
| 22 | 5.0 | 2.0 | 93.0 | 10720 | −186 |
| 23 | 10.0 | 15.0 | 75.0 | 649.3 | 23 |
| 24 | 20.0 | 40.0 | 40.0 | 29.7 | 120 |
| 25 | 40.0 | 15.0 | 45.0 | 2.1 | 383 |

EXAMPLE 6

The same glass as shown in Example 5, TaSi$_2$ and boride B (a mixture of TaB$_2$, NbB$_2$, VB$_2$, WB, MoB and CrB in equimolar amounts) were formulated in ratios shown in Table 6. The mixture was kneaded with a vehicle (solution of acryl resin in terpineol) to make a resistor paste. This resistor paste was treated in a manner similar to Example 1 to form a resistor onto 96% alumina substrate. A sheet resistance value of this resistor at 25° C. and a temperature coefficient of resistance measured between 25° C. and 125° C. are shown in Table 6. The loaded life span, moisture resistance property and thermal shock property were determined as in Example 1 and rates of change in resistance values were all within ±1%.

TABLE 6

| Sample No. | Composition TaSi$_2$ (wt %) | Boride B (wt %) | Glass (wt %) | Property Resistance Value (ohm/□) | Temperature Coefficient of Resistance (ppm/°C.) |
|---|---|---|---|---|---|
| 26 | 2.0 | 10.0 | 88.0 | 58640 | −301 |
| 27 | 6.0 | 20.0 | 74.0 | 6951 | −125 |
| 28 | 10.0 | 30.0 | 60.0 | 441.6 | 41 |
| 29 | 2.0 | 68.0 | 30.0 | 56.2 | 110 |
| 30 | 30.0 | 30.0 | 40.0 | 5.9 | 306 |

EXAMPLE 7

The same glass as shown in Example 1, silicide B (a mixture of TiSi$_2$, CrSi$_2$, ZrSi$_2$ and VSi$_2$ in equimolar amounts) and TaB$_2$ were formulated in ratios shown in Table 7. The mixture was kneaded with a vehicle (solution of acryl resin in terpineol) to make a resistor paste. This resistor paste was treated in a manner similar to Example 1 to form a resistor onto 96% alumina substrate. A sheet resistance value of this resistor at 25° C. and a temperature coefficient of resistance measured between 25° C. and 125° C. are shown in Table 7. The loaded life span, moisture resistance property and thermal shock property were determined as in Example 1 and rates of change in resistance values were all within ±1%.

TABLE 7

| Sample No. | Composition Silicide B (wt %) | TaB$_2$ (wt %) | Glass (wt %) | Property Resistance Value (ohm/□) | Temperature Coefficient of Resistance (ppm/°C.) |
|---|---|---|---|---|---|
| 31 | 4.0 | 6.0 | 90.0 | 124100 | −466 |
| 32 | 10.0 | 4.0 | 86.0 | 11030 | −196 |
| 33 | 10.0 | 30.0 | 60.0 | 764.1 | 19 |
| 34 | 20.0 | 10.0 | 70.0 | 90.7 | 101 |
| 35 | 30.0 | 30.0 | 40.0 | 8.5 | 219 |

EXAMPLE 8

The same glass as shown in Example 1, silicide B (a mixture of TiSi$_2$, CrSi$_2$, ZrSi$_2$ and VSi$_2$ in equimolar amounts) and boride B (a mixture of TaB$_2$, NbB$_2$, VB$_2$, WB, MoB and CrB in equimolar amounts) were formulated in ratios shown in Table 8. The mixture was kneaded with a vehicle (solution of acryl resin in terpineol) to make a resistor paste. This resistor paste was treated in a manner similar to Example 1 to form a resistor onto 96% alumina substrate. A sheet resistance value of this resistor at 25° C. and a temperature coefficient of resistance measured between 25° C. and 125° C. are shown in Table 8. The loaded life span, moisture resistance property and thermal shock property were determined as in Example 1 and rates of change in resistance values were all within ±1%.

TABLE 8

| Sample No. | Composition Silicide B(wt %) | Boride B(wt %) | Glass (wt %) | Property Resistance Value (ohm/□) | Temperature Coefficient of Resistance (ppm/°C.) |
|---|---|---|---|---|---|
| 36 | 4.0 | 4.0 | 92.0 | 112100 | −448 |
| 37 | 12.0 | 6.0 | 82.0 | 9053 | −166 |
| 38 | 10.0 | 30.0 | 60.0 | 714.6 | 19 |
| 39 | 25.0 | 15.0 | 60.0 | 56.6 | 111 |
| 40 | 10.0 | 60.0 | 30.0 | 6.2 | 232 |

EXAMPLE 9

The same glass as shown in Example 1, TiSi$_2$, boride B (a mixture of TaB$_2$, NbB$_2$, VB$_2$, WB, MoB and CrB in equimolar amounts) and Ta$_2$O$_5$ were formulated in ratios shown in Table 9. The mixture was kneaded with a vehicle (solution of acryl resin in terpineol) to make a resistor paste. This resistor paste was treated in a manner similar to Example 1 to form a resistor onto 96% alumina substrate. A sheet resistance value of this resistor at 25° C. and a temperature coefficient of resistance measured between 25° C. and 125° C. are shown in Table 9. The loaded life span, moisture resistance property and thermal shock property were determined as in Example 1 and rates of change in resistance values were all within ±1%.

TABLE 9

| Sample No. | Composition TiSi$_2$ (wt %) | Boride B (wt %) | Ta$_2$O$_5$ (wt %) | Glass (wt %) | Property Resistance Value (ohm/□) | Temperature Coefficient of Resistance (ppm/°C.) |
|---|---|---|---|---|---|---|
| 41 | 6.0 | 10.0 | 1.0 | 83.0 | 32150 | −288 |
| 42 | 6.0 | 10.0 | 2.0 | 82.0 | 13460 | −201 |
| 43 | 15.0 | 10.0 | 5.0 | 70.0 | 827.1 | 47 |
| 44 | 20.0 | 15.0 | 10.0 | 55.0 | 84.9 | 100 |

TABLE 9-continued

| | Composition | | | | Property | |
|---|---|---|---|---|---|---|
| Sample No. | $TiSi_2$ (wt %) | Boride B (wt %) | $Ta_2O_5$ (wt %) | Glass (wt %) | Resistance Value (ohm/□) | Temperature Coefficient of Resistance (ppm/°C.) |
| 45 | 25.0 | 25.0 | 7.0 | 43.0 | 6.1 | 221 |

EXAMPLE 10

The same glass as shown in Example 1, $TaSi_2$, boride A (a mixture of $TiB_2$ and $ZrB_2$ in equimolar amounts) and additive A (a mixture of $Ta_2O_5$, $Nb_2O_5$, $V_2O_5$, $MoO_3$, $WO_3$, $ZrO_2$, $TiO_2$, $Cr_2O_3$ in equimolar amounts) were formulated in ratios shown in Table 10. The mixture was kneaded with a vehicle (solution of acryl resin in terpineol) to make a resistor paste. This resistor paste was treated in a manner similar to Example 1 to form a resistor onto 96% alumina substrate. A sheet resistance value of this resistor at 25° C. and a temperature coefficient of resistance measured between 25° C. and 125° C. are shown in Table 10. The loaded life span, moisture resistance property and thermal shock property were determined as in Example 1 and rates of change in resistance values were all within ±1%.

TABLE 10

| | Composition | | | | Property | |
|---|---|---|---|---|---|---|
| Sample No. | $TaSi_2$ (wt %) | Boride A (wt %) | $Ta_2O_5$ (wt %) | Glass (wt %) | Resistance Value (ohm/□) | Temperature Coefficient of Resistance (ppm/°C.) |
| 46 | 2.0 | 8.0 | 2.0 | 88.0 | 68440 | −300 |
| 47 | 8.0 | 8.0 | 2.0 | 82.0 | 7731 | −137 |
| 48 | 10.0 | 10.0 | 5.0 | 75.0 | 1029 | 36 |
| 49 | 10.0 | 20.0 | 10.0 | 60.0 | 114.5 | 103 |
| 50 | 30.0 | 30.0 | 7.0 | 33.0 | 4.2 | 239 |

EXAMPLE 11

The same glass as shown in Example 1, silicide A (a mixture of $TaSi_2$, $WSi_2$, $MoSi_2$, $NbSi_2$, $TiSi_2$, $CrSi_2$, $ZrSi_2$ and $VSi_2$ in equimolar amounts), $TaB_2$ and Si were formulated in ratios shown in Table 11. The mixture was kneaded with a vehicle (solution of acryl resin in terpineol) to make a resistor paste. This resistor paste was treated in a manner similar to Example 1 to form a resistor onto 96% alumina substrate. A sheet resistance value of this resistor at 25° C. and a temperature coefficient of resistance measured between 25° C. and 125° C. are shown in Table 11. The loaded life span, moisture resistance property and thermal shock property were determined as in Example 1 and rates of change in resistance values were all within ±1%.

TABLE 11

| | Composition | | | | Property | |
|---|---|---|---|---|---|---|
| Sample No. | Silicide A (wt %) | $TaB_2$ (wt %) | Si (wt %) | Glass (wt %) | Resistance Value (ohm/□) | Temperature Coefficient of Resistance (ppm/°C.) |
| 51 | 2.0 | 6.0 | 8.0 | 84.0 | 266870 | −312 |
| 52 | 10.0 | 10.0 | 6.0 | 74.0 | 48120 | −210 |
| 53 | 10.0 | 20.0 | 3.0 | 67.0 | 1271 | 27 |
| 54 | 20.0 | 20.0 | 1.0 | 59.0. | 73.7 | 104 |
| 55 | 30.0 | 26.0 | 2.0 | 42.0 | 8.8 | 235 |

EXAMPLE 12

The same glass as shown in Example 1, silicide B (a mixture of $TiSi_2$, $CrSi_2$, $ZrSi_2$ and $VSi_2$ in equimolar amounts) $ZrB_2$ and additive B (a mixture of Si, $Si_3O_4$, SiC, AlN, BN and $SiO_2$ in equimolar amounts) were formulated in ratios shown in Table 12. The mixture was kneaded with a vehicle (solution of acryl resin in terpineol) to make a resistor paste. This resistor paste was treated in a manner similar to Example 1 to form a resistor onto 96% alumina substrate. A sheet resistance value of this resistor at 25° C. and a temperature coefficient of resistance measured between 25° C. and 125° C. are shown in Table 12. The loaded life span, moisture resistance property and thermal shock property were determined as in Example 1 and rates of change in resistance values were all within ±1%.

TABLE 12

| | Composition | | | | Property | |
|---|---|---|---|---|---|---|
| Sample No. | Silicide B (wt %) | $ZrB_2$ (wt %) | Additive B (wt %) | Glass (wt %) | Resistance Value (ohm/□) | Temperature Coefficient of Resistance (ppm/°C.) |
| 56 | 2.0 | 6.0 | 10.0 | 82.0 | 254490 | −344 |
| 57 | 10.0 | 10.0 | 7.0 | 73.0 | 40556 | −225 |
| 58 | 15.0 | 15.0 | 5.0 | 65.0 | 1034 | 22 |
| 59 | 20.0 | 20.0 | 1.0 | 59.0 | 59.1 | 87 |

TABLE 12-continued

| | Composition | | | | Property | |
|---|---|---|---|---|---|---|
| Sample No. | Silicide B (wt %) | $ZrB_2$ (wt %) | Additive B (wt %) | Glass (wt %) | Resistance Value (ohm/□) | Temperature Coefficient of Resistance (ppm/°C.) |
| 60 | 25.0 | 30.0 | 1.0 | 44.0 | 6.3 | 252 |

Figure 2:
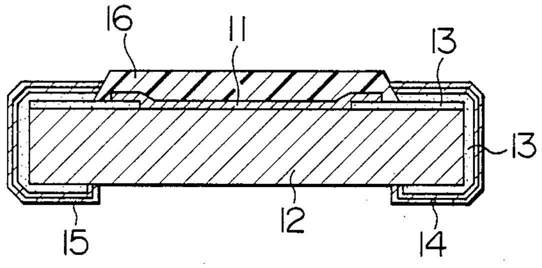
FIG. 2 is a cross-sectional view of an embodiment of a chip resistor of the same device.
Figure 3:
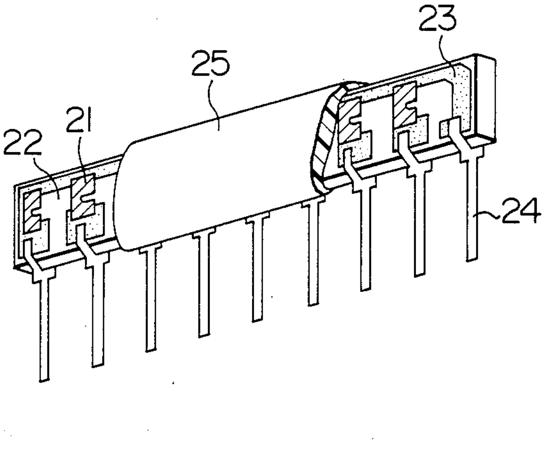
FIG. 3 is a perspective view of an embodiment of a resistor network of the same device. In the figures, numerals mean as follows.

FIGS. 1 through 3 are drawings to show practical applications of the glaze resistor in accordance with the present invention, respectively; FIG. 1 shows an embodiment used in a hybrid integrated circuit device, FIG. 2 shows an embodiment used in a chip resistor and FIG. 3 shows an embodiment used in resistor network.

In FIG. 1, numeral 1 denotes a resistor, numeral 2 denotes a ceramic substrate, numeral 3 denotes electrodes, numeral 4 denotes a semiconductor element, numeral 5 denotes a chip part and numeral 6 denotes an overcoat. In the embodiment shown in FIG. 1, electrodes 3 are formed on both surfaces of ceramic substrate 2 in a determined conductor pattern. Thick film resistor 1 is formed by printing so as to be provided between the electrodes 3 and at the same time, semiconductor element 4 and chip part 5 are actually mounted thereon.

Further in FIG. 2, numeral 11 denotes a resistor, numeral 12 denotes a ceramic substrate, numeral 13 denotes electrodes, numeral 14 denotes a Ni plated layer, numeral 15 denotes a Sn-Pb plated layer and numeral 16 denotes an overcoat. In the embodiment shown in FIG. 2, resistor 11 is formed on ceramic substrate 12 and electrodes 13 connected at both terminals of the resistor 11 are formed over the upper surface, side and bottom surface of the both terminals of the ceramic substrate 12. Further, Ni plated layer 14 and Sn-Pb plated layer 15 are formed on the electrodes 13.

Furthermore in FIG. 3, numeral 21 denotes a resistor, numeral 22 denotes a ceramic substrate, numeral 23 denotes electrodes, numeral 24 denotes a lead terminal and numeral 30 denotes a coating material. In the embodiment shown in FIG. 3, electrodes 23 are formed on ceramic substrate 22 in a determined conductor pattern. Resistor 21 is provided so as to contact with the electrodes 23.

As described above, the glaze resistor in accordance with the present invention can be formed by sintering in a non-oxidizing atmosphere and hence, circuit can be formed in coupled with conductor pattern of base metals such as Cu, etc. Therefore, according to the present invention, thick film hybrid IC using Cu conductor pattern can be realized, resulting in contribution to high density and high speed digitalization of thick film hybrid IC.

What is claimed is:

1. A glaze resistor comprising a ceramic substrate and a conductive component, comprising 4.0 to 70.0 wt% of a metal silicide and a metal boride and 30.0 to 96.0 wt% of a glass; the weight ratio of the metal boride to the metal silicide being from 1:99 to 68:32 .

2. A glaze resistor according to claim 1, wherein said glass is composed of a metal oxide not reduced upon sintering in a non-oxidizing atmosphere and has a softening point ranging from 500 to 800° C.

3. A glaze resistor according to claim 1, wherein said metal silicide is at least one of tantalum silicide, tungsten silicide, molybdenum silicide, niobium silicide, titanium silicide, chromium silicide, zirconium silicide and vanadium silicide and said metal silicide comprises 90.0 wt% or more disilicide, respectively.

4. A glaze resistor according to claim 1, wherein said metal boride is at least one of tantalum boride, niobium boride, tungsten boride, molybdenum boride, chromium boride, titanium boride and zirconium boride.

5. A glaze resistor according to claim 1, wherein said metal boride is any one of titanium boride and zirconium boride or a mixture thereof and titanium boride and zirconium boride comprises 90.0 wt% or more diborides, respectively.

6. A glaze resistor according to claim 1, wherein at least one of $Ta_2O_5$, $Nb_2O_5$, $V_2O_5$, $MoO_3$, $WO_3$, $ZrO_2$, $TiO_2$ and $Cr_2O_3$ and suboxides thereof is incorporated.

7. A glaze resistor according to claim 1, wherein at least one of Si, $Si_3N_4$, SiC, AlN, BN and $SiO_2$ is incorporated.

8. A hybrid integrated circuit device comprising a substrate having formed thereon a glaze resistor as claimed in claim 1.

9. A glaze resistor according to claim 2, wherein said metal silicide is at least one of tantalum silicide, tungsten silicide, molybdenum silicide, niobium silicide, titanium silicide, chromium silicide, zirconium silicide and vanadium silicide and said metal silicide comprises 90.0 wt% or more disilicide, respectively.

* * * * *